(12) United States Patent
Zhang et al.

(10) Patent No.: US 9,081,868 B2
(45) Date of Patent: Jul. 14, 2015

(54) VOICE WEB SEARCH

(75) Inventors: Fan Zhang, Cambridge (CA);
Yan-Ming Cheng, Inverness, IL (US);
Changxue Ma, Barrington, IL (US);
James R. Talley, Austin, TX (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 556 days.

(21) Appl. No.: 12/639,176

(22) Filed: Dec. 16, 2009

(65) Prior Publication Data

US 2011/0145214 A1 Jun. 16, 2011

(51) Int. Cl.
*G06F 7/00* (2006.01)
*G06F 17/30* (2006.01)

(52) U.S. Cl.
CPC .... *G06F 17/30899* (2013.01); *G06F 17/30654* (2013.01)

(58) Field of Classification Search
CPC .............. G06F 17/30654; G06F 17/30899; G06F 17/30979; G06F 17/27; G06F 17/30864; H04M 2201/40
USPC .................. 707/722, 748, 758, 728, 760, 723
See application file for complete search history.

(56) References Cited

U.S. PATENT DOCUMENTS

| | | | | |
|---|---|---|---|---|
| 5,987,457 | A * | 11/1999 | Ballard ................................. | 1/1 |
| 6,912,498 | B2 | 6/2005 | Stevens et al. | |
| 6,976,019 | B2 * | 12/2005 | Davallou ............................. | 1/1 |
| 7,162,423 | B2 | 1/2007 | Thrasher et al. | |
| 7,366,668 | B1 | 4/2008 | Franz et al. | |
| 8,010,523 | B2 * | 8/2011 | Djabarov ...................... | 707/721 |
| 8,090,738 | B2 * | 1/2012 | Paek et al. ..................... | 707/765 |
| 8,831,946 | B2 * | 9/2014 | Mamou ......................... | 704/254 |
| 2004/0093216 | A1 * | 5/2004 | Ashish et al. ............... | 704/270.1 |
| 2005/0004799 | A1 | 1/2005 | Lyudovyk | |
| 2005/0201532 | A1 * | 9/2005 | Chang ........................ | 379/88.17 |
| 2007/0011133 | A1 * | 1/2007 | Chang ................................ | 707/1 |
| 2008/0130699 | A1 | 6/2008 | Ma et al. | |
| 2008/0162472 | A1 | 7/2008 | Cheng et al. | |
| 2008/0221863 | A1 * | 9/2008 | Liu et al. ........................... | 704/2 |
| 2009/0030894 | A1 * | 1/2009 | Mamou et al. ..................... | 707/5 |
| 2009/0228280 | A1 | 9/2009 | Oppenheim et al. | |
| 2009/0287626 | A1 * | 11/2009 | Paek et al. ........................ | 706/46 |
| 2009/0287680 | A1 * | 11/2009 | Paek et al. ......................... | 707/5 |
| 2009/0287681 | A1 * | 11/2009 | Paek et al. ......................... | 707/5 |

OTHER PUBLICATIONS

Huang et al., Mining Key Phrase Translations from Web Corpora, Proceedings of Human Language Technology Conference and Conference on Emperical Methods in Natural Language Processing (HLT/EMNLP), pp. 483-490, Vancouver, Oct. 2005.*
Chelba et al., Retrieval and Browsing of Spoken Content, IEEE Signal Processing Magazine, pp. 39-49, May 2008.*
Jonathan Mamou and Bhuvana Ramabhadran. Phonetic query expansion for spoken document retrieval. In Proc. Interspeech'08, pp. 2106-2109, Brisbane, Australia, Sep. 2008.*
Franz, et al, "Searching the Web by Voice," Proceedings of the 19th International Conference on Computer Linguistics, Taipei, Taiwan, 2002, Association for Computer Linguistics, vol. 2, pp. 1-5.

* cited by examiner

*Primary Examiner* — Cheyne D Ly
(74) *Attorney, Agent, or Firm* — Remarck Law Group PLC

(57) ABSTRACT

A search system will receive a voice query and use speech recognition with a predefined vocabulary to generate a textual transcription of the voice query. Queries are sent to a text search engine, retrieving multiple web page results for each of these initial text queries. The collection of the keywords is extracted from the resulting web pages and is phonetically indexed to form a voice query dependent and phonetically searchable index database. Finally, a phonetically-based voice search engine is used to search the original voice query against the voice query dependent and phonetically searchable index database to find the keywords and/or key phrases that best match what was originally spoken. The keywords and/or key phrases that best match what was originally spoken are then used as a final text query for a search engine. Search results from the final text query are then presented to the user.

17 Claims, 2 Drawing Sheets

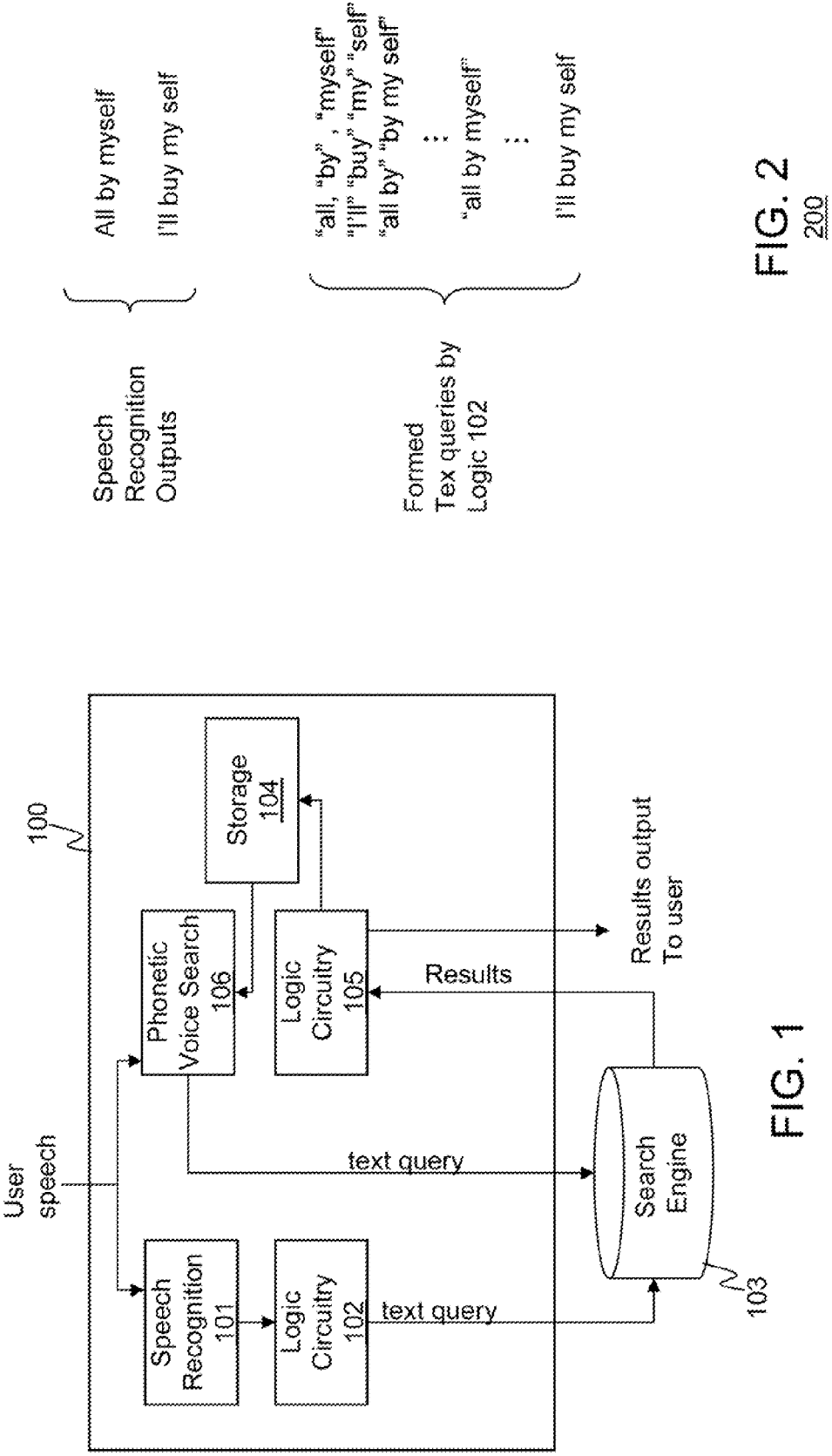

VOICE WEB SEARCH

FIELD OF THE INVENTION

The present invention relates generally to a method and apparatus for generating a text query from a voice query which is not limited by any predefined vocabulary.

BACKGROUND OF THE INVENTION

Web search is an important activity in daily life for many individuals. Individuals use queries to characterize topics of interest and then gain information from the Web on those topics. For convenience, and sometimes necessity, users of the Web prefer to deliver a query in voice and expect a search engine return web results with respect to the voice query. Typically, search engines which are able to accept a voice query, have a voice interface (or a speech-to-text system) which converts the voice query to a text query; then a standard text search engine produce results with respect to the text query.

In voice search systems having a traditional text search engine augmented with a speech-to-text based voice interface, the misrecognition of voice queries by the speech-to-text system is a formidable obstacle, often leading to completely irrelevant search results. Typically, a speech-to-text system has a predefined "vocabulary" or a list of words, which the system can recognize. A word outside of this list is an out-of-vocabulary (OOV) word and cannot be recognized, instead being recognized as word in the predefined vocabulary. In the field of web search, where new phrases and names are constantly introduced, the chances of a user uttering an OOV word in a voice query are very high. In the past, enlarging the predefined vocabulary was used to slightly mitigate the misrecognition caused by OOV words. However, up to certain extent a very large vocabulary makes a speech-to-text system impractical. Therefore, a need exists for a method and apparatus for generating a text query from a voice query, which is not limited by any predefined vocabulary.

BRIEF DESCRIPTION OF THE DRAWINGS

FIG. 1. is a block diagram of a system for generating a text query from a voice query.

FIG. 2 illustrates a text transcription output from a speech-to-text converter.

Figure 3:
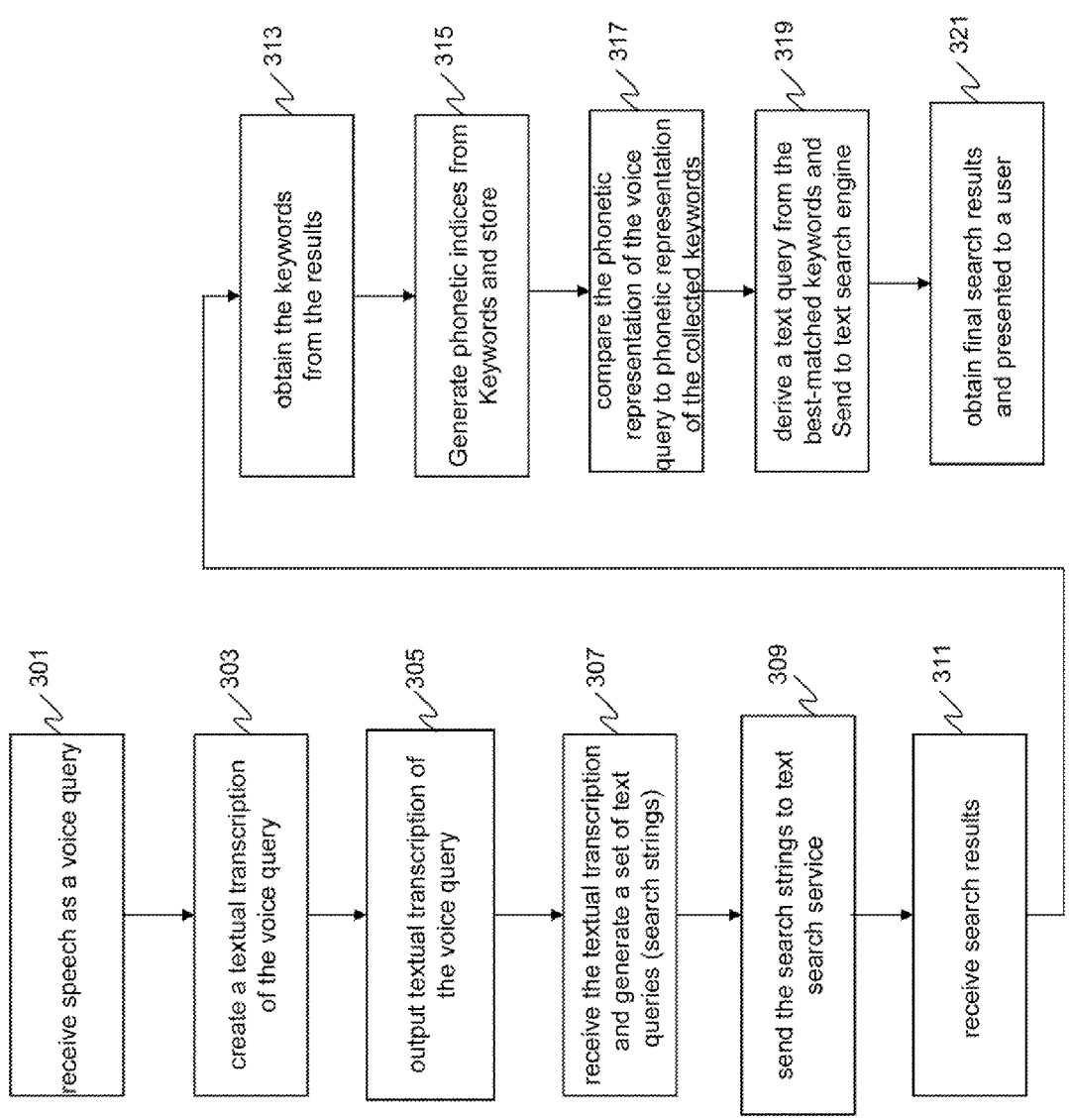
FIG. 3. is a flow chart showing operation of the system of FIG. 1.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to address the above-mentioned need, a method and apparatus for generating a corresponding text query from an utterance is provided herein. During operation, a search system will receive a voice query (utterance) and use traditional speech recognition with a predefined vocabulary to generate a textual transcription (or multiple textual transcriptions) of the voice query. However, instead of using the textual transcription(s) as a text query to produce the final search results, words or short word sequences extracted from the textual transcription(s) are used to generate n initial text queries.

Each of the n text queries is independently sent to a text search engine—retrieving multiple web page results for each of these initial text queries. Then, the collection of the keywords and/or key phrases extracted from the resulting web pages of all n initial text queries is phonetically indexed to form a voice query dependent and phonetically searchable index database. Finally, a phonetically-based voice search engine (which does not predefine a vocabulary) is used to search the original voice query against the voice query dependent and phonetically searchable index database to find the keywords and/or key phrases that best match what was originally spoken. The keywords and/or key phrases that best match what was originally spoken are then used as a final text query for a search engine. Search results from the final text query are then presented to the user.

The text query generated from keywords and/or key phrases that best match what was originally spoken (the final text query) is not bound by the predefined vocabulary of the speech recognition system—it can contain words and/or expressions which are out of the speech recognizer's predefined vocabulary. To be clear, OOV words in the generated text query can never directly come out from the speech recognition sub-system, but they could appear in the voice query dependent and phonetically searchable index database by virtue of their co-occurrence or association with words of the predefined vocabulary in the web pages which resulted from the n initial text queries.

The keywords and/or key phrases that best match what was originally spoken are determined by matching the phonetic representation of the original voice query and indices of the voice query dependent and phonetically searchable index database. This phonetically-based voice search is able to produce words and/or expressions which are out of the predefined vocabulary of the speech recognition system. These previously OOV words and/or expressions can be selected from the voice query dependent and phonetically searchable index database based upon their better phonetic match to the original voice query.

For example, if the original voice query was "C# example" with a user intention of finding a C# programming language example, and if the keyword "C#" was not in the predefined vocabulary of the speech recognizer, we may get a transcript like "see Sharp example". We might form six initial queries ("see Sharp", "Sharp example", "see example", "see", "Sharp" and "example") and send them to a traditional text search engine. If we retain the top ten resulting web pages from each of these web searches, we would have a collection of sixty resulting web pages for the original voice query. The Yahoo BOSS® search engine shows C# is a keyword among the resulting web pages for the text query "see Sharp". All key-words and/or keyphrases are extracted from the collection of resulting web pages to form the voice query dependent and phonetically searchable index database for the voice query, "C# example". Using the phonetically-based voice search technique and the original voice query, the best matched key-phrases will be "C# example" and "see Sharp example". The top phrase is then presented as text to a search engine.

The present invention encompasses a method for generating a text query from a voice query. The method comprises the steps of receiving a textual transcription of a spoken query, generating a plurality of search strings based on the textual representation of the spoken query, and sending the plurality of search strings to a first search engine. Results are received from the first search engine and keywords are obtained from the results. A text query is derived from keywords that best match the spoken query and the text query is sent to a second search engine.

The present invention additionally encompasses an apparatus comprising speech recognition circuitry receiving a textual transcription of a spoken query and outputting a textual representation of the spoken query, wherein the text output is taken from a vocabulary. Logic circuitry is provided for generating a plurality of search strings based on the textual representation of the spoken query and sending the plurality of search strings to a first search engine. Second logic circuitry receives results from the first search engine and determines keywords from the results. Finally, phonetic voice search circuitry derives a text query from keywords that best match the spoken query and sends the text query to a second search engine.

Turning now to the drawings, where like numerals designate like components, FIG. 1 is a block diagram showing apparatus 100 capable of generating a text query from a voice query, and returning search results to more accurately reflect what was in the voice query. As shown, system 100 comprises speech recognition circuitry 101, logic circuitry 102, second logic circuitry 105, phonetic voice search circuitry 106, and storage 104.

Additionally search service 103 is provided, and preferably comprises an internet-based search engine such as, but not limited to Google®, Bing®, Yahoo®, . . . , etc. However, in alternate embodiments of the present invention search service 103 may comprise other search services such as file search services, database search services, . . . , etc. Finally, search service 103 is shown existing external to apparatus 100, however, in alternate embodiments of the present invention search service 103 may be located internal to apparatus 100.

Speech recognition circuitry 101 comprises commonly known circuitry that converts user speech into text. As part of speech recognition circuitry 101, a database exists (not shown in FIG. 1) which contains a "vocabulary" of possible spoken words. When converting spoken words into text, any text output is chosen from the vocabulary.

Logic circuitry 102 and second logic circuitry 105 both comprise a digital signal processor (DSP), general purpose microprocessor, a programmable logic device, or application specific integrated circuit (ASIC) and are utilized to formulate a query.

Phonetic voice search circuitry 106 comprises a circuitry that converts a voice to the phonemes that were actually spoken, and compares the phoneme string with phoneme indices of a database.

Finally, storage/database 104 comprises standard random access memory and is used to store information such as the voice query dependent and phonetically searchable index database.

During operation a user's voice query is received at speech recognition circuitry 101. Speech recognition circuitry 101 outputs text transcription of the voice query. The text transcription includes a plurality of words that exist within a "vocabulary" which were spoken between a beginning and ending times of the voice query. Each word can be associated with an acoustic score (e.g., a probabilistic score). For example, if a user utters a voice query "all by myself", speech recognition may return the text transcription shown in FIG. 2 to logic circuitry 102.

Logic circuitry 102 receives the text output from speech recognition circuitry 101 as text transcription 200, and generates a set of queries (search strings). For example, for the illustration of FIG. 2, the set of queries may comprise "all", "by", "myself", "I'll", "my", "self", "buy", "all by", "by myself", "I'll buy", "buy my", . . . , . . . "all by myself", . . . , "I'll buy my self".

As is evident, the queries may become quite numerous. Because of this, in an embodiment of the present invention, the number of queries may be limited. This limitation may be accomplished by selecting those with a high confidence score and/or a high keyword-like score, excluding those so-called stop (or function) words which appear often in every document such as 'of', 'in', etc.

Once textual queries have been generated by logic circuitry 102, logic circuitry 102 sends the queries to search service 103. As discussed above, in one embodiment of the present invention the queries are sent via the internet to a web-based search engine such as Yahoo BOSS®. In response, query results are received at second logic circuitry 105. In this particular example, it is envisioned that a plurality of rank ordered web pages are received for each query. However, as one of ordinary skill in the art would recognize, depending upon what was searched (web pages, files, text, . . . , etc.), the rank-ordered results could comprise rank-ordered files, rank-ordered text, . . . , etc.

As is known in the art, each web page has an associated (predefined) set of keywords, or it can be analyzed to extract a set of keywords. Second logic circuitry 105 obtains the keywords from the multiple pages returned from the search and stores them in storage 104.

Once the collection of keywords is extracted from the multiple pages, second logic circuitry 105 generates the phonetic indices from the phonetic representation of each keyword in order to perform fast and effective matches against any phonetic string. The phonetic indices are stored in storage 104 as a voice query dependent and phonetically searchable index. Second logic circuitry 105 then instructs phonetic voice search circuitry 106 to perform a phonetic based voice search and compare the phonetic representation of the voice query to the phonetic representation of the collected keywords via the phonetic indices. Phonetic voice search circuitry 106 determines a short list of keywords based on the comparison and ordered based on match likelihood. It should be noted that a comparison is not made between the vocabulary words returned from speech recognition circuitry 101 and the keywords. Instead, the keywords are phonetically compared to the phonemes that were actually spoken from the original voice query.

There may be several techniques to accomplish the comparison and ordering of the keywords. One such technique is to compare the phonetic histograms of voice query and each keywords described in U.S. patent application Ser. No.

11/669,865, entitled METHOD AND APPARATUS FOR INTENTION BASED COMMUNICATIONS FOR MOBILE COMMUNICATION DEVICES, and incorporated by reference herein.

Once the keywords have been ordered based on their phonetic similarity to the voice query, phonetic voice search circuitry 106 determines the best matches and uses these to create a final text query or compound text queries with logic operations, such as AND, OR, etc. This text query is sent to a search engine 103, and final results are returned to second logic circuitry 105, which are then presented to a user.

FIG. 3. is a flow chart showing operation of the system of FIG. 1. The logic flow begins at step 301 where speech recognition circuitry 101 receives speech as a voice query, and creates a textual transcription of the voice (spoken) query (step 303), and outputs the textual transcription to logic circuitry 102 as a textual transcription (step 305). The text output is taken from a vocabulary.

At step 307 logic circuitry 102 receives the text output from speech recognition circuitry 101 as text transcription 200, and generates a set of text queries (search strings) based on the textual representation of the spoken query. At step 309, logic circuitry 102 then sends the search strings to a text search service, or search engine (e.g., a web-based search engine) 103. Search results are received at second logic circuitry 105 (step 311). The results obtained from the search engine may, for example, comprise a plurality of web pages.

Once search results are received, second logic circuitry 105 obtains the keywords from the results (step 313). The keywords are those keywords associated with the returned results. Phonetic indices are generated from the phonetic representation of each keyword by second logic circuitry 105. Second logic circuitry 105 then stores them in storage 104 as a voice query dependent and phonetically searchable index in order to perform fast and effective matches against any phonetic string (step 315). At step 317, phonetic voice search circuitry 106 compares the phonetic representation of the voice query to phonetic representation of the collected keywords via phonetic indices; and a short list of keywords is determined and ordered based on match likelihood. At step 319 phonetic voice search circuitry 106 derives a text query from the best-matched keywords (i.e., best matched to what was spoken) and transmits this query to the text search engine 103 again. It should be noted that in a first embodiment, the first and the second search engine are the same, however in alternate embodiments this query may be transmitted to a second search engine (not shown). Additionally, the step of deriving the text query from keywords comprises the step of comparing the phonetic representation of the spoken query to phonetic representations of the keywords. Finally, at step 321, search results are received by logic circuitry 105 and presented to a user.

While the invention has been particularly shown and described with reference to a particular embodiment, it will be understood by those skilled in the art that various changes in form and details may be made therein without departing from the spirit and scope of the invention. For example, the above idea can be applied to in-vocabulary queries, which for some reason or another, are still misrecognized. In this case, they are treated like OOV queries, in which case the search proceeds as delineated above. It is intended that such changes come within the scope of the following claims:

The invention claimed is:

1. A computer-implemented method, comprising:
   receiving, at a computing system having one or more processors, a speech input corresponding to a web-based search query;
   obtaining, by the computing system, a plurality of possible transcriptions of the speech input;
   selecting, by the computing system, a plurality of transcriptions having highest confidence scores from the plurality of possible transcriptions to obtain a set of selected transcriptions;
   obtaining, by the computing system, first web-based search results for each transcription of the set of selected transcriptions;
   obtaining, by the computing system, extracted keywords from a web page associated with each first web-based search result;
   performing, by the computing system, a voice-to-text search of the first web-based search results using the speech input and the extracted keywords to obtain second web-based search results; and
   outputting, from the computing system, the second web-based search results.

2. The computer-implemented method of claim 1, wherein obtaining the second web-based search results includes:
   obtaining, by the computing system, a search string as a result of the voice-to-text search of the first web-based search results using the speech input and the extracted keywords; and
   initiating, by the computing system, a web-based search using the search string to obtain (i) the second web-based search results and (ii) a ranking of the second web-based search results indicative of a relative importance of each of the second web-based search results.

3. The computer-implemented method of claim 1, wherein selecting the set of selected transcriptions includes:
   obtaining, by the computing system, the confidence score for each possible transcription, the confidence score being indicative of a likelihood that a specific possible transcription is a correct transcription of the speech input; and
   selecting, by the computing system, ones of the plurality of possible transcriptions having the highest confidence scores to obtain the set of selected transcriptions.

4. The computer-implemented method of claim 1, wherein the extracted keywords are derived from metadata for webpages corresponding to the first web-based search results.

5. The computer-implemented method of claim 4, wherein a specific metadata includes at least one keyword associated with a corresponding webpage.

6. The computer-implemented method of claim 1, wherein the computing system includes at least one remote server.

7. A computing system having one or more processors configured to perform operations comprising:
   receiving a speech input corresponding to a web-based search query;
   obtaining a plurality of possible transcriptions of the speech input;
   selecting a plurality of transcriptions having highest confidence scores from the plurality of possible transcriptions to obtain a set of selected transcriptions;
   obtaining first web-based search results for each transcription of the set of selected transcriptions;
   obtaining extracted web content from a web page associated with each first web-based search result;
   performing a voice-to-text search of the first web-based search results using the speech input and the extracted web content to obtain second web-based search results; and
   outputting the second web-based search results.

8. The computing system of claim 7, wherein obtaining the second web-based search results includes:

obtaining a search string as a result of the voice-to-text search of the first web-based search results using the speech input and the extracted keywords; and initiating, by the computing system, a web-based search using the search string to obtain (i) the second web-based search results and (ii) a ranking of the second web-based search results indicative of a relative importance of each of the second web-based search results.

9. The computing system of claim 7, wherein selecting the set of selected transcriptions includes:

obtaining the confidence score for each possible transcription, the confidence score being indicative of a likelihood that a specific possible transcription is a correct transcription of the speech input; and selecting ones of the plurality of possible transcriptions having the highest confidence scores to obtain the set of selected transcriptions.

10. The computing system of claim 7, wherein the extracted keywords are derived from metadata for webpages corresponding to the first web-based search results.

11. The computing system of claim 10, wherein a specific metadata includes at least one keyword associated with a corresponding webpage.

12. The computing system of claim 7, wherein the computing system includes at least one remote server.

13. A non-transitory computer-readable medium having instructions stored thereon that, when executed by one or more processors of a computing system, cause the computing system to perform operations comprising:

receiving a speech input corresponding to a web-based search query;

obtaining a plurality of possible transcriptions of the speech input;

selecting most-likely transcriptions from the plurality of possible transcriptions to obtain a set of selected transcriptions;

obtaining first web-based search results for each transcription of the set of selected transcriptions;

obtaining extracted web content from each first web-based search result;

performing a voice-to-text search of the first web-based search results using the speech input and the extracted web content to obtain second web-based search results; and outputting the second web-based search results.

14. The computer-readable medium of claim 13, wherein obtaining the second web-based search results includes:

obtaining a search string as a result of the voice-to-text search of the first web-based search results using the speech input and the extracted keywords; and initiating, by the computing system, a web-based search using the search string to obtain (i) the second web-based search results and (ii) a ranking of the second web-based search results indicative of a relative importance of each of the second web-based search results.

15. The computer-readable medium of claim 13, wherein selecting the most-likely transcriptions includes:

obtaining a confidence score for each possible transcription indicative of a likelihood that the possible transcription is a correct transcription of the speech input; and selecting ones of the plurality of possible transcriptions having the highest confidence scores to obtain the set of selected transcriptions.

16. The computer-readable medium of claim 13, wherein the extracted keywords are derived from metadata for webpages corresponding to the first web-based search results, and wherein a specific metadata includes at least one keyword associated with a corresponding webpage.

17. The computer-readable medium of claim 13, wherein the computing system includes at least one remote server.

* * * * *